United States Patent
Doebel et al.

(10) Patent No.: US 10,572,245 B1
(45) Date of Patent: Feb. 25, 2020

(54) IDENTIFYING VERSIONS OF RUNNING PROGRAMS USING SIGNATURES DERIVED FROM OBJECT FILES

(71) Applicant: Amazon Technologies, Inc., Seattle, WA (US)

(72) Inventors: Bjoern Doebel, Dresden (DE); Konrad Jan Miller, Dresden (DE); Martin Thomas Pohlack, Dresden (DE)

(73) Assignee: Amazon Technologies, Inc., Seattle, WA (US)

( * ) Notice: Subject to any disclaimer, the term of this patent is extended or adjusted under 35 U.S.C. 154(b) by 224 days.

(21) Appl. No.: 15/252,038

(22) Filed: Aug. 30, 2016

(51) Int. Cl.
  *G06F 8/656* (2018.01)
  *G06F 8/71* (2018.01)

(52) U.S. Cl.
  CPC ............... *G06F 8/656* (2018.02); *G06F 8/71* (2013.01)

(58) Field of Classification Search
  CPC ... G06F 8/60; G06F 8/65; G06F 8/656; G06F 8/658; G06F 8/66; G06F 8/70; G06F 8/71; G06F 8/73; G06F 8/74; G06F 8/654; G06F 11/07; G06F 11/0703; G06F 11/0718; G06F 11/0751; G06F 11/0766; G06F 11/0772; G06F 11/0775; G06F 11/079; G06F 11/0793; G06F 11/30; G06F 11/3003; G06F 11/3006; G06F 11/302; G06F 11/3037; G06F 11/3055; G06F 11/3065; G06F 11/3072
  USPC .................................................. 717/168–178
  See application file for complete search history.

(56) References Cited

U.S. PATENT DOCUMENTS

| 5,359,730 | A | 10/1994 | Marron | |
|---|---|---|---|---|
| 6,418,444 | B1 * | 7/2002 | Raduchel | G06F 9/44589 707/999.103 |
| 6,513,050 | B1 * | 1/2003 | Williams | G06F 11/1451 |
| 6,594,822 | B1 * | 7/2003 | Schweitz | G06F 8/71 717/140 |
| 6,629,315 | B1 | 9/2003 | Naylor | |
| 6,738,932 | B1 * | 5/2004 | Price | G06F 11/079 714/38.11 |
| 6,802,054 | B2 * | 10/2004 | Faraj | G06F 11/3636 714/45 |

(Continued)

OTHER PUBLICATIONS

R. Holmes and D. Notkin, "Identifying program, test, and environmental changes that affect behaviour," 2011 33rd International Conference on Software Engineering (ICSE), Honolulu, HI, 2011, pp. 371-380. (Year: 2011).*

(Continued)

*Primary Examiner* — Andrew M. Lyons
(74) *Attorney, Agent, or Firm* — Robert C. Kowert; Kowert, Hood, Munyon, Rankin & Goetzel, P.C.

(57) ABSTRACT

A particular portion of a program which can be read from on-disk representations of the program as well as from memory images of the program is identified for use as a version discriminator. A first representation of the portion may be obtained from a first memory image of the program, corresponding to a first running instance of the program. The first representation may be compared to a second representation obtained at a development environment. Based on the results of the comparison, a particular version of the program corresponding to the first running instance may be identified. An indication of the particular version may be stored.

20 Claims, 11 Drawing Sheets

(56) References Cited

U.S. PATENT DOCUMENTS

| | | | |
|---|---|---|---|
| 7,143,395 B2* | 11/2006 | Applin | G06F 8/71 717/130 |
| 7,222,341 B2 | 5/2007 | Forbes et al. | |
| 7,386,839 B1* | 6/2008 | Golender | G06F 11/366 717/131 |
| 7,526,654 B2* | 4/2009 | Charbonneau | G06F 21/565 713/182 |
| 7,647,636 B2* | 1/2010 | Polyakov | G06F 21/566 713/187 |
| 7,784,044 B2 | 8/2010 | Buban et al. | |
| 7,805,419 B2* | 9/2010 | Newman | G06F 21/64 707/695 |
| 7,831,838 B2* | 11/2010 | Marr | G06F 21/52 713/187 |
| 8,165,998 B2* | 4/2012 | Semerdzhiev | G06F 16/10 707/690 |
| 8,166,492 B2* | 4/2012 | Fathalla | G06F 9/45537 717/162 |
| 8,219,978 B2* | 7/2012 | Gamou | G06F 21/51 717/126 |
| 8,312,435 B2* | 11/2012 | Wygodny | G06F 11/3636 717/124 |
| 8,327,351 B2 | 12/2012 | Paladino et al. | |
| 8,468,516 B1 | 6/2013 | Chen et al. | |
| 8,504,994 B2* | 8/2013 | Golender | G06F 9/547 717/128 |
| 8,510,596 B1* | 8/2013 | Gupta | G06F 11/073 714/15 |
| 8,528,087 B2* | 9/2013 | Hsu | G06F 21/566 711/163 |
| 8,607,208 B1 | 12/2013 | Arnold et al. | |
| 8,627,097 B2* | 1/2014 | Wolf | G06F 21/51 707/698 |
| 8,719,935 B2* | 5/2014 | Polyakov | G06F 11/0748 726/23 |
| 8,762,495 B2* | 6/2014 | Obata | G06F 9/45537 709/219 |
| 8,805,953 B2* | 8/2014 | Murphy | G06F 11/1453 707/610 |
| 8,955,038 B2* | 2/2015 | Nicodemus | G06F 11/3495 726/1 |
| 9,002,812 B2* | 4/2015 | Ferguson | H04L 9/0643 707/697 |
| 9,164,754 B1* | 10/2015 | Pohlack | G06F 8/658 |
| 9,292,332 B1 | 3/2016 | Liguori et al. | |
| 9,335,986 B1 | 5/2016 | Bowen | |
| 9,449,042 B1* | 9/2016 | Evans | G06F 8/36 |
| 9,594,553 B2* | 3/2017 | Ji | G06F 8/75 |
| 9,838,418 B1* | 12/2017 | Wardle | H04L 63/145 |
| 2002/0178439 A1* | 11/2002 | Rich | G06F 9/541 717/174 |
| 2003/0105889 A1* | 6/2003 | Shi | G06F 9/44521 719/331 |
| 2003/0200207 A1* | 10/2003 | Dickinson | G06F 8/658 |
| 2004/0068720 A1* | 4/2004 | Hundt | G06F 9/44521 717/158 |
| 2004/0103412 A1* | 5/2004 | Rao | G06F 8/65 717/171 |
| 2004/0107416 A1* | 6/2004 | Buban | G06F 8/658 717/170 |
| 2004/0117768 A1 | 6/2004 | Chang et al. | |
| 2004/0215668 A1 | 10/2004 | Sun | |
| 2005/0038832 A1* | 2/2005 | Feigenbaum | G06F 11/0748 |
| 2005/0091192 A1* | 4/2005 | Probert | G06F 8/62 |
| 2006/0080531 A1* | 4/2006 | Sinha | G06F 21/52 713/168 |
| 2006/0288217 A1* | 12/2006 | Jennings | G06F 16/137 713/176 |
| 2006/0288341 A1 | 12/2006 | Wurden et al. | |
| 2007/0005992 A1* | 1/2007 | Schluessler | G06F 21/54 713/193 |
| 2008/0134148 A1* | 6/2008 | Clark | G06F 11/3636 717/128 |
| 2008/0201779 A1* | 8/2008 | Tahan | G06F 21/564 726/23 |
| 2009/0257595 A1* | 10/2009 | de Cesare | G06F 21/575 380/277 |
| 2010/0088683 A1* | 4/2010 | Golender | G06F 9/547 717/128 |
| 2010/0146325 A1* | 6/2010 | John | G06F 11/0793 714/3 |
| 2010/0218049 A1* | 8/2010 | Mostow | G06F 11/3692 714/38.14 |
| 2010/0269105 A1* | 10/2010 | Arnold | G06F 8/71 717/153 |
| 2011/0035733 A1* | 2/2011 | Horning | G06F 21/14 717/140 |
| 2011/0126179 A1* | 5/2011 | Hartman | G06F 8/656 717/140 |
| 2012/0166811 A1* | 6/2012 | Maheshwari | G06F 8/71 713/187 |
| 2013/0019231 A1* | 1/2013 | Mangard | G06F 8/43 717/151 |
| 2013/0145456 A1* | 6/2013 | Kiehtreiber | G06F 21/51 726/17 |
| 2013/0232343 A1* | 9/2013 | Horning | G06F 21/14 713/190 |
| 2013/0246837 A1* | 9/2013 | Wolf | G06F 8/62 714/2 |
| 2013/0339799 A1* | 12/2013 | Zheng | G06F 11/3612 714/38.11 |
| 2014/0082641 A1* | 3/2014 | Clark | G06F 9/44521 719/331 |
| 2014/0245268 A1* | 8/2014 | Golender | G06F 11/366 717/128 |
| 2014/0282431 A1 | 9/2014 | Delio, Jr. | |
| 2014/0325644 A1* | 10/2014 | Oberg | G06F 21/57 726/22 |
| 2014/0359239 A1* | 12/2014 | Hiremane | G06F 21/575 711/163 |
| 2015/0113518 A1* | 4/2015 | Liem | G06F 21/57 717/171 |
| 2015/0163248 A1* | 6/2015 | Epstein | G06F 21/604 726/1 |
| 2015/0229737 A1 | 8/2015 | Oyama et al. | |
| 2015/0304351 A1* | 10/2015 | Oberheide | H04W 12/12 726/25 |
| 2015/0370685 A1* | 12/2015 | Heymann | G06F 11/368 714/38.1 |
| 2016/0062765 A1* | 3/2016 | Ji | G06F 8/75 717/122 |
| 2016/0147586 A1* | 5/2016 | Mayer | G06F 11/0721 714/37 |
| 2016/0203313 A1* | 7/2016 | El-Moussa | G06F 8/65 726/23 |
| 2017/0083399 A1* | 3/2017 | Smirnov | G06F 11/0778 |
| 2017/0177272 A1* | 6/2017 | Ilangovan | G06F 3/0614 |
| 2018/0052997 A1* | 2/2018 | Wray | G06F 21/566 |

OTHER PUBLICATIONS

K. Jezek, L. Holy, A. Slezacek and P. Brada, "Software Components Compatibility Verification Based on Static Byte-Code Analysis," 2013 39th Euromicro Conference on Software Engineering and Advanced Applications, Santander, 2013, pp. 145-152. (Year: 2013).*

E. Kodhai and B. Dhivya, "Detecting and investigating the source code changes using logical rules," 2014 International Conference on Circuits, Power and Computing Technologies [ICCPCT-2014], Nagercoil, 2014, pp. 1603-1608. (Year: 2014).*

Wikipedia, "Comparison of executable file formats", Retrieved from URL: https://en.wikipedia.org/wiki/Comparison_of_exectable_file_formats on Jul. 7, 2016, pp. 1-5.

Wikipedia, "Dynamic software updating", Retrieved from URL: https://en.wikipedia.org/wiki/Dynamic_software_updating on Jun. 18, 2016, pp. 1-9.

(56) References Cited

OTHER PUBLICATIONS

"Executable and Linkable Format (ELF)", Tool Interface Standards (TIS), Portable Formats Specification, Version 1.1, 2001, pp. 1-60.
Wikipedia, "ptrace", Retrieved from URL: https://en.wikipedia.org/wiki/Ptrace on Jul. 13, 2016, pp. 1-4.
"Advisories, publicly release or pre-released", Xen Aecurity Advisories, Retrieved from URL: http://xenbits.xen.org/xsa/ on Jun. 18, 2016, pp. 1-9.
U.S. Appl. No. 15/608,478, filed May 30, 2017, Vineet Shashikant Chaoji et al.

* cited by examiner

IDENTIFYING VERSIONS OF RUNNING PROGRAMS USING SIGNATURES DERIVED FROM OBJECT FILES

BACKGROUND

Many mission-critical computing applications rely on network-accessible services, e.g., using virtualized resources at cloud-based provider networks. In order to support such applications, the operators of the provider networks may utilize large fleets of hardware servers, which may sometimes comprise thousands of hosts spread over many data centers in many different geographical locations. At least some of the programs used to implement such services, including for example various administrative virtualization management-related programs run locally at virtualization hosts, may be expected to run continuously for long periods of time (e.g., weeks, months or even years) without restarts to support targeted availability levels for customer applications. If such administrative programs are restarted, the customer application programs that rely on the administrative programs may experience unacceptable service interruptions.

As with most programs, updates to the long-running programs may be required at various points in time, e.g., due to the identification of defects and corresponding fixes. Many new software builds of the long running programs may be developed over time, representing functional enhancements, support for newer hardware, defect removals, and so forth. Because of a variety of reasons including the longevity of the programs, the potentially large number of execution platforms in the fleets (at which different updates may have been applied at different times), and the possibility that "hot-patching" techniques which allow in-memory versions of the programs to be modified may have been used at some or all execution platforms, it may not be straightforward to determine exactly which versions of the long-running programs are running at any given platform within the fleet. Such situations may be especially likely in scenarios in which the rate at which new versions of the long-running programs are produced and deployed is high.

Even in scenarios in which records or logs of applied software changes at various execution platforms are maintained, it may sometimes be the case that some of the records may be lost (or may contain errors). When deciding whether a given long-running program contains a particular defect, and whether the program may therefore require a specific version-dependent remedial action, administrators may thus be faced with a non-trivial challenge, especially when the defect could compromise the security of customer applications or infrastructure components.

Figure 1:
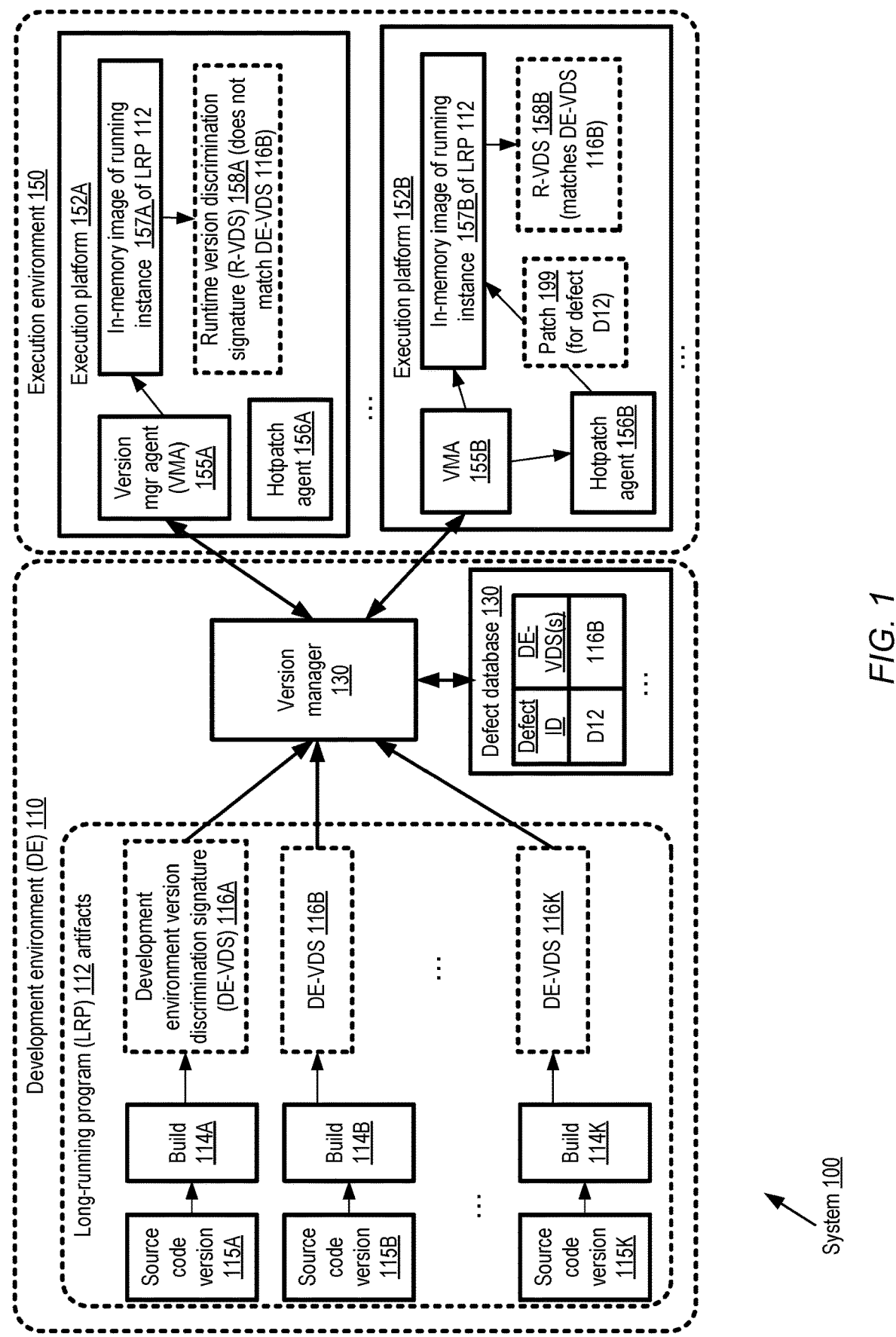
FIG. 1 illustrates an example system environment in which version discrimination signatures derived from artifacts generated at a development environment may be used to determine whether long-running programs may be affected by specific defects, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for uniquely identifying the versions of long-running programs using signatures derived from selected subsets of object files are described. The term "long-running program", as used herein, may refer generally to any program which is expected, under normal operating conditions, to remain up and running across program updates—that is, a change to the version of a long-running program which is being used at a particular execution platform is typically performed without terminating the process(es) or threads of execution which collectively make up the program. The objectives of the version determination techniques used in various embodiments may comprise minimizing the impact of version determination on the availability, performance and functionality of the running programs. At a high level, the algorithms described herein with respect to various embodiments may comprise preparing version discrimination signatures for programs based on the analysis of development environment artifacts (e.g., software builds containing executable/compiled versions of the programs, stored in one or more object files), extracting corresponding run-time signatures from the memory images of the programs while the programs remain running at the execution platforms where the programs are deployed, and comparing the signatures obtained from the development environment with the run-time signatures to uniquely identify the versions of the running programs. Such techniques may be especially useful in the context of defect remediation, since some of the builds of the long-running programs may be known to contain one or more defects, while subsequent builds may include fixes or "patches" for the defects. In large server fleets, e.g., in the context of a provider network, thousands of execution platforms may run any of several versions of the long-running program at a given point in time. Being able to systematically, accurately and efficiently identify which particular platforms need a patch corresponding to a given defect may avoid a lot of unnecessary resource usage—e.g., including network traffic associated with unnecessary deployments of the defect remediation code, tracking/recording version changes, and so on. The techniques described herein may be especially useful for (but are not limited to) responding to security-related defects, which may require urgent remediation.

As used herein, the term "execution platform" may refer to one or more physical or virtual machines at which a program runs. The term "running instance of a program" may refer to one or more processes that are launched at an execution platform, which collectively implement the functionality of the program. The terms "memory image" and "in-memory representation" may be used synonymously to refer to the contents of the portion of the execution platform's memory being used for a running instance (which may comprise, among other types of content, executable instructions which implement the functionality of the program, data read or written by the instructions, and so on).

According to one embodiment, one or more computing devices (e.g., administrative or control-plane components of a cloud computing infrastructure) may determine that a defect corresponding to a particular long-running program deployed at various platforms has been detected. The particular program may, for example, implement one or more functions or operations of a service with a continuous availability objective, and as such may be required to remain running for as long as possible, without interruptions or down-times. The indication that a defect has been detected may, for example, be generated when an entry for the defect is added to a defect database, or when an entry for a software change that fixes a defect is added to a log of changes made to a software repository.

Using one or more software builds of the program, where individual ones of the software builds include object files corresponding to respective source code versions of the program, one or more portions of object code which are to be used as version discriminators may be identified. A given portion of object code may comprise some number of contiguous bits or bytes within an object file (specified, for example, using non-negative integer offsets within subunits of the object files as described below) in various embodiments; one or more such portions may collectively be used as a version discriminator. In some embodiments, headers within an object file corresponding to the program may indicate the locations and sizes of various sections, such as a read-only "text" section comprising executable instructions, and such headers may be used to identify the sections whose contents are candidates for version discrimination. The particular portions which are identified as candidates may correspond to parts of the object file which are (a) present in the memory images of the running program at the execution platforms where the programs are instantiated, and (b) not going to be modified within the memory of the execution platforms. Only a subset of a candidate section or sections which is sufficient to uniquely distinguish among the set of versions of interest may be used as a version discriminator in various embodiments, so that for example the overhead associated with computing the run-time signatures is kept within reasonable bounds. It is noted that in at least some embodiments, a portion of code used for version discrimination need not necessarily be part of a read-only section of the object file—instead, for example, a part of the object file (or corresponding memory image) which is designated as writable but is not expected to be modified at run time may be used. (In some cases, the whole object file and/or memory image may be designated as writable, e.g., using the appropriate access permission mechanism.) Generally speaking, if a code portion uniquely distinguishes among the versions of interest and is readable from the memory image as well as an on-disk object file, that code portion may be used as a version discriminator in various embodiments. As discussed below in further detail, in those cases in which a new build is generated in response to the detection of one or more defects, the portions selected for signatures need not necessarily contain the executable code that corresponds to the defect(s) (i.e., compiled versions of the source code which contains the defect(s)). Transformation functions (e.g., one or more hash functions, or digest-creating functions) may be applied to the bit sequences which make up the selected portions in various builds to obtain respective numeric values which are to serve as the build-specific version discrimination signatures in various embodiments. Thus, for example, if there are 100 different builds of a given long-running program which may be in use at the execution platform fleet, 100 different development-environment signatures may be generated.

At some or all of the execution platforms where an instance of the long-running program may be present, a run-time signature corresponding to the one or more portions of object code selected at the development environment may be obtained, without terminating the execution of the running instance in various embodiments. In some embodiments, for example, a debugger tool or a process trace tool may be used to access the in-memory representation of the running instance, and the portions to be used for the signature may be read in from the memory. By comparing the run-time signature with the development environment signatures, the particular version of the program that is running at the execution platform may be identified in such embodiments. Consider an example scenario in which an object file corresponding to a long-running program contains a section or sub-unit named "section-A", with the location of section-A within the file being indicated in a header included at the beginning of the file. Assume that a portion of section-A starting at byte offset 4096, and ending at offset 16383, is identified as a version discriminator for the long-running program. Corresponding to 10 different builds of the program, 10 different development-environment signatures may be generated using the bytes within the offset range 4096-16383 inclusive of the respective section-As of the builds. At each execution platform where one of the versions of the program is running, the same range of bytes within section-A of the memory image may be extracted, a run-time signature obtained from it, and compared with the 10 different development-environment signatures to unambiguously identify the running version.

If the identified running version at a given execution platform is known to (or suspected to) contain a defect, a defect remediation operation may be initiated in at least some embodiments. For example, a "hot patch" technique may be used to modify the contents of the in-memory representation to remedy the defect in some cases.

The manner in which the responsibilities for signature computations and signature comparisons are distributed among various parts of the system may vary in different embodiments. For example, in one embodiment, an administrative component of the service responsible for deploying a given long-running program (which may be termed a version manager) may initiate the computations involved in obtaining development-environment version discrimination signatures for some selected set of builds. Lightweight agents of the service, which may be installed at respective execution platforms, may be responsible for computing the run-time version discrimination signatures at the execution platforms in one such embodiment. In one implementation, the version manager may transmit the development-environment signatures to the agents, where the signature comparisons may be performed. In another implementation, the agents may transmit the run-time signatures to the version manager, and the comparisons may be performed at the version manager. The version manager itself may be implemented in a distributed manner in some embodiments, and may comprise a number of software and/or hardware components. In one embodiment, at least some previously-generated development-environment signatures may be re-used when a new iteration of version identification is performed, while in another embodiment new development-environment signatures may be generated (for one or more older builds) each time a new build is generated. In some implementations, the entire byte sequence representing a version discriminator may be compared between the development environment builds and the memory images, without applying a transformation function to reduce the size of set of bytes which have to be compared.

In some embodiments, the agents at the execution platforms where the programs are running may be responsible for initiating remedial actions (if any such actions are required) following version identification; in other embodiments, remedial actions may be initiated from the version manager rather than the agents. In at least one embodiment, a version manager separate from the agents installed at the execution platforms may not be required: e.g., version discrimination signatures may be generated automatically whenever a new build is generated, as part of the regular build process, and transmitted to agents at execution platforms where the programs are running. In one embodiment, version determination may be performed using the signature-comparison techniques for defect remediation purposes alone; in other embodiments, version determination may be performed periodically (e.g., once every D days or once every B builds) regardless of whether a defect is found or not.

In at least some embodiments, a similar approach to that described above for long-running programs for version determination may be taken with respect to version determination for dynamically-linked libraries. At a given execution platform, one or more long-running programs may utilize a given dynamically linked library. To obtain version discrimination signatures for the dynamically linked libraries at the development environment, certain portions of the object files of the library (which may correspond to relocation addresses that are determined/modified dynamically) may be excluded from the portions selected for signatures. At the execution platforms, an agent may examine the in-memory representations of various long-running programs which utilize the dynamically linked library, and generate run-time signatures from the selected portions. It may be the case that different versions of a given dynamically linked library are used by several different long running programs, so the tool or agent responsible for generating the run-time signatures may have to analyze the in-memory representations of each of the long-running programs and identify the specific versions of the library that are being used by each program.

Example System Environment

FIG. 1 illustrates an example system environment in which version discrimination signatures derived from artifacts generated at a development environment may be used to determine whether long-running programs may be affected by specific defects, according to at least some embodiments. As shown, system 100 comprises a development environment (DE) 110 and an execution environment 150. One or more long-running programs may be run at respective execution platforms 152A and 152B. A given execution platform 152 may comprise one or more physical and/or virtual computing devices in various embodiments. One or more long-running programs (LRPs) 112 may be included among the software being managed and produced at the development environment. After an instance (e.g., one or more processes or threads of execution) of a given LRP is launched at an execution platform 152, that instance may typically be expected to remain running for long periods of time (e.g., days, weeks, months or years), with the lifetime of a given LRP typically overlapping with the creation of numerous updated builds of the LRP at the development environment. In many cases, a long-running program 112 may be used to implement at least some of the functionality of a service with a continuous availability requirement—e.g., an LRP may be part of the infrastructure used in order to support a service that is expected to have a 99.999999% uptime (a downtime of 1 time unit out of every 100,000,000 time units). In other cases, LRPs may not necessarily be associated with a service or a particular continuous availability objective.

In the depicted embodiment, a variety of artifacts associated with a given LRP 112 may be created and/or stored (at least temporarily) at the development environment 110. For example, respective software builds 114A-114K corresponding to source code versions 113A-113K of the LRP 112 may be created over some period of time. A given build 114 may comprise one or more compiled or executable files, which may also be referred to as object files, with the contents of each file comprising one or more sections organized according to a particular file formatting standard in use (such as ELF (executable and linkable format), PE (portable executable format), or the like). From the object files making up the builds 114, respective development-environment version discrimination signatures (DE-VDSs) 116 (e.g., DE-VDSs 116A-116K corresponding to builds 114A—114K) may be generated in the depicted embodiment, e.g., either at the initiative of a version manager 130, or as part of the normal build procedures in use at development environment 110. It is noted that several different builds may be created from a given source code version in some embodiments—e.g., using different compiler options or different compilers for respective builds. As a result, in general there may be a 1:N relationship between source code versions 113 and builds 114, where N is greater than or equal to one. When multiple builds are available for a given source code version, respective DE-VDSs may be generated for some subset (or all) of the multiple builds in various embodiments.

In various embodiments, the generation of the DE-VDSs 116 may include, among other tasks, examining the contents of headers and various sections of object files of the builds, identifying a starting offset and an ending offset within selected sections which represent bit sequences that (a) can be used to distinguish among the builds 114 (b) remain unchanged/unmodified when the program is run at an execution platform, and (c) are small enough in size to avoid excessive computational effort to generate run-time signatures. Various factors which may be used in deciding which specific sections of the executable should be used as possible inputs for signatures (such as whether the section is read-only or not) are discussed below. In addition, the tasks performed for DE-VDS generation may include storing descriptors of the identified portions (indicating the executable file section names, the offsets etc.) which can be used at execution platforms 152 to generate run-time signatures, and applying selected transformation functions (e.g., one or more hash functions) to the identified sections. The output of the transformation functions may be used as the respective DE-VDSs 116 for the builds 114 in the depicted embodiment. It is noted that the DE-VDSs may be derived from the object files of the long-running programs in the depicted embodiment, rather than from the source code, because source code may typically be unavailable at the execution platforms where the LRP runs and where corresponding run-time signatures have to be computed. Thus, the DE-VDSs may be generated from sections of object files that can be found within in-memory representations of running instances of the LRP 112, and therefore represent sections that can also be used as run-time version discriminators. The term "version discriminator" as used herein refers to data derivable from one or more artifacts associated with a program (e.g., object files of the program, configuration files of the program, etc.) which can be used to distinguish among at least a selected set of different versions of the program.

In the embodiment shown in FIG. 1, the development environment may comprise a defect database 130. In the defect database, the DE-VDSs 116 which correspond to builds which contain the defects may be stored—e.g., as shown, the build with DE-VDS 116B may be affected by the defect with identifier D12. The version manager 130, which is also shown as part of the development environment 110 in the depicted embodiment, may be responsible for coordinating the effort to identify which specific execution platforms 152 are affected by one or more defects such as defect D12. In order to do so, the version manager 130 may cause respective version manager agents 155 (e.g., VMA 155A at execution platform 152A, or VMA 155B at execution platform 152B) to examine the contents of the in-memory representations 157 of running instances of LRP 112 at their respective execution platforms. The VMAs may, for example, comprise or utilize a debugger or process trace tool to attach to the local in-memory representations 157, read the sequences of bits between the starting and ending offsets of the same sections which were used for the DE-VDSs, and generate respective runtime version discrimination signatures R-VDSs 158 without restarting the LRP instances. For example, R-VDS 158A may be generated from instance 157A of LRP 112 at execution platform 152A, while R-VDS 158B may be generated from instance 157B of LRP 112 at execution platform 152B. The R-VDSs may be compared to one or more DE-VDSs to determine the specific version of the LRP 112 which is running at a given execution platform.

In the example scenario shown in FIG. 1, R-VDS 158A does not match DE-VDS 116B, and therefore running instance 157A may be assumed to be free of defect D12. However, R-VDS 158B does match DE-VDS 116B, and therefore running instance 157B may be assumed to be affected by defect D12. In at least some embodiments, a remedial action to respond to the defect may be undertaken, e.g., at the initiative of VMA 155B or at the initiative of the version manager 130. As shown, at least some of the execution platforms 152 may each comprise a hotpatch agent 156 (e.g., agent 156A at execution platform 152A, and agent 156B at execution platform 152B), responsible for dynamically applying patches or fixes for various defects to the long-running programs without restarting the programs. VMA 155B may cause hotpatch agent 156B to apply patch 199 (comprising the fix for defect D12) to LRP instance 157B in the depicted scenario after it is determined that the instance 157B is affected by D12. In addition to helping identify the running instances which have to be updated to resolve defects, the version identification techniques described herein may provide the additional benefit of avoiding resource consumption associated with unnecessary updates. For example, because it can be determined that running instance 157A is free of defect D12, running instance 157A does not have to be updated to fix defect D12 in the embodiment depicted in FIG. 1. In large fleets of execution platforms, substantial resource savings may be achieved by avoiding unnecessary updates.

Generally speaking, the determination of the specific versions of LRPs that are running at different execution platforms may be performed for a variety of reasons, and may not necessarily be triggered by defect resolution requirements alone. Thus, if R-VDS 158 happened to match DE-VDS 116K, this information confirming the identity of the running version of LRP at platform 152A may still be valuable, and a record indicating the identified version may be stored (e.g., together with an associated timestamp by the version manager 130). In some cases, the identification of the versions of LRPs may be used as part of a general fleet health management strategy—e.g., the fraction of execution platforms that are running versions of an LRP older than X months may be identified (so that, for example, upgrades to more recent versions can be planned), or the distribution of different in-use versions of various LRPs across the fleet may be determined. The comparisons of the DE-VDSs and the R-VDSs may be performed locally at the execution platforms in some embodiments (as in FIG. 1), or remotely (e.g., at the version manager 130 or some other entity) in other embodiments. The timing of the R-VDS generations and comparisons may differ from one embodiment to another. In one embodiment, an event-driven approach may be taken, in which R-VDSs are generated only in response to explicit commands or requests from the version manager 130. In other embodiments, R-VDSs may be generated periodically according to a schedule (e.g., once every T hours, or after every N invocations of the service for which the LRP is being used), so that the version manager is able to maintain updated records indicating which specific versions of the LRP are running at various platforms 152 of the execution environment 150.

Deployment Timeline Example

A given execution platform may often comprise persistent storage devices (such as various types of magnetic disk-based storage devices) at which executable versions of programs may be installed or stored. In some environments, depending on the way in which deployments are administered and on the degree to which restarts of long-running programs are avoided, the version of a long-running program that is stored on disk at an execution platform may differ from the in-memory version.

Figure 2:
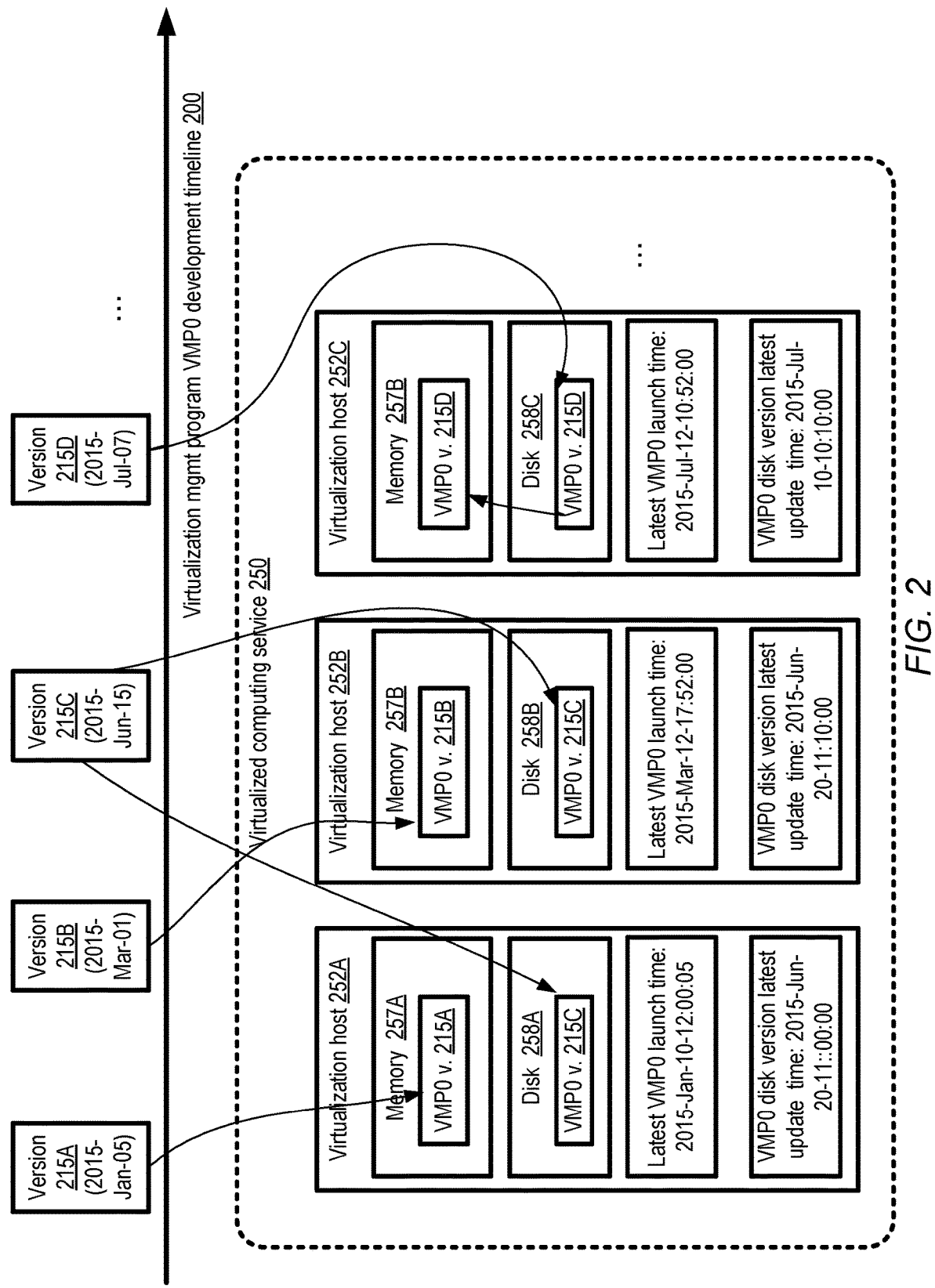
FIG. 2 illustrates an example timeline of the development and deployment of a virtualization management-related program, according to at least some embodiments.

FIG. 2 illustrates an example timeline of the development and deployment of a virtualization management-related program, according to at least some embodiments. Virtualization management programs, such as components of hypervisors and administrative operating systems which may be set up to support virtual machines at virtualized computing services, may represent examples of long-running programs for which signature-based version discrimination techniques such as those discussed above may be used in various embodiments. Virtualization hosts (the hardware servers at which virtual machines are set up on behalf of customers) may represent examples of execution platforms for the long-running virtualization management programs in FIG. 2.

Along timeline 200 for a given virtualization management program VMP0 used at a virtualized computing service 250, four different versions of VMP0 are shown. Versions 215A-215D are generated on January 5, March 1, June 15, and Jul. 7, 2015 in the depicted example.

According to the deployment policy being enforced for VMP0 at the virtualization hosts 252 (e.g., hosts 252A-252C), a running version of VMP0 is not to be restarted for as long as possible. Restarts may be unavoidable under certain conditions, of course—e.g., in the event of some types of power failures, hardware failures and the like. Disk-based versions of VMP0 may be updated without restarting the running instances of VMP0, e.g., according to schedules determined by a version manager or other administrative components of the virtualized computing service 250. The disk-based versions at different virtualization hosts 252 need not necessarily be kept in sync with one another (just as the in-memory running versions need not be identical at all the virtualization hosts). At the point of time corresponding to the states of virtualization hosts shown in FIG. 2, the running instance of VMP0 corresponds to version 215A at host 252A, version 215B at host 252B, and version 215D at host 252C. The respective on-disk versions at hosts 252A, 252B and 252C are versions 215C, 215C and 215D respectively. The most recent dates on which VMP0 was launched (e.g., the times at which respective portions of the host memory 257A, 257B or 257B were allocated for starting up VMP0) are January 10, March 12 and July 12 respectively, as indicated by the "Latest VMP0 launch time" entries shown in FIG. 2. The most recent dates at which new disk-based versions are stored at disks 258A, 258B and 258C of hosts 252A-252C are June 20, June 20 and July 10, respectively. In the cases of hosts 252A and 252B, the in-memory versions are older than the on-disk versions, while in the case of host 252C, the in-memory version matches the on-disk version. As indicated by the arrow linking on-disk version on host 252C with the local in-memory version, the current disk-based version of VMP0 may have been used to launch the in-memory version at host 252C. At the other hosts, the on-disk version which was initially used to launch VMP0 may have been overwritten since the launch, and/or the currently running in-memory versions may have been dynamically updated without re-using the on-disk versions.

As is made evident by FIG. 2, in general, it may not be straightforward to determine exactly which version of a given long-running program is currently being run at an execution platform, even if information about the on-disk versions installed at each of the platforms is known. In many large provider network environments, a virtualized computing service 250 may comprise tens of thousands of virtualization hosts, which may collectively be running hundreds of different versions of a program such as VMP0 concurrently. As such, the signature-based techniques discussed herein may be extremely helpful in verifying the versions that are currently in use at various platforms, especially when decisions regarding urgent (e.g., security-related) defect fixes have to be made.

Examples of Long Running Programs

Figure 3:
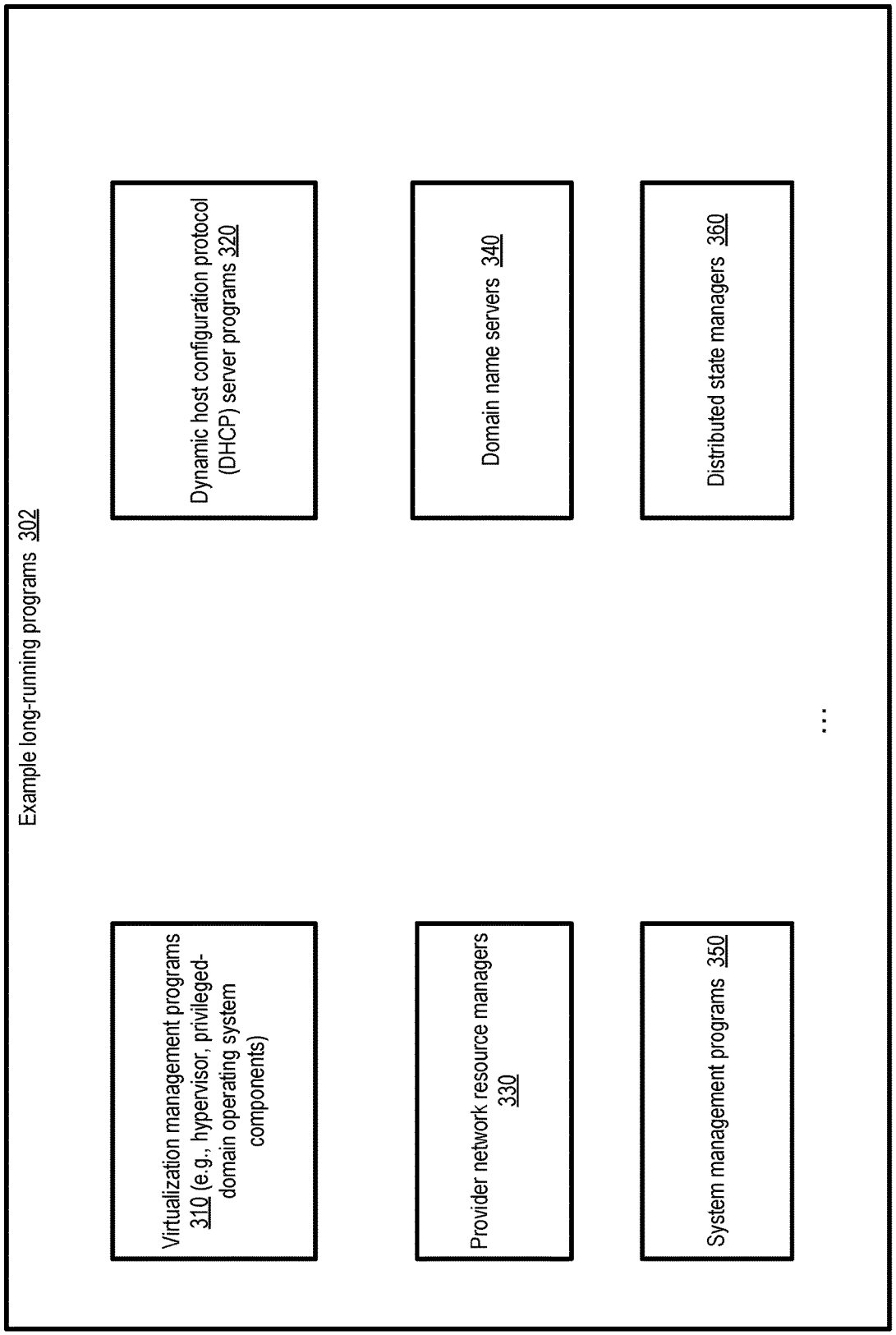
FIG. 3 provides examples of programs for which version discrimination signatures may be employed, according to at least some embodiments.

FIG. 3 provides examples of programs for which version discrimination signatures may be employed, according to at least some embodiments. As mentioned above, virtualization management programs 310 may represent one class of long-running programs 302. In some embodiments, virtualization management programs may include hypervisors (which may act as intermediaries between hardware devices and virtual machines at a host), each of which in turn may include one or more long-running user-mode programs and/or long-running kernel-mode programs or daemons. In at least one embodiment, a special operating system instance may be designated for virtualization management at a host (e.g., in addition to or instead of a hypervisor), and various programs or daemons making up the operating system may represent other examples of long-running programs.

A number of programs associated with networking protocols, including for example DHCP (Dynamic Host Configuration Protocol) server programs 320 and Domain Name System (DNS) servers 340 may also be appropriate for signature-based version identification techniques in various embodiments. Other long-running programs may include resource managers 330 associated with various network-accessible services of a provider network (such as storage service managers, machine learning service managers, and so on), system management programs 350 and/or distributed state managers 360 (which may for example be used for clustered applications and the like).

Build-Based Version Discrimination Signatures

Figure 4:
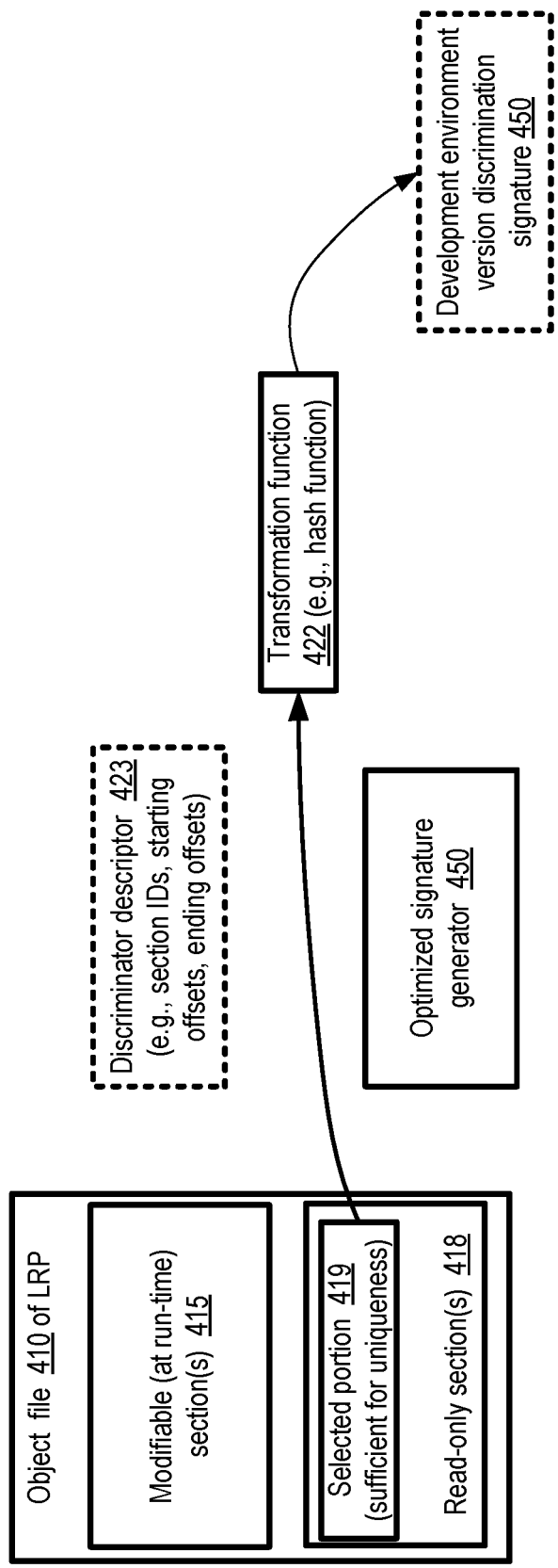
FIG. 4 provides an overview of example operations which may be performed to obtain a version discrimination signature using an executable file generated in a development environment, according to at least some embodiments.

FIG. 4 provides an overview of example operations which may be performed to obtain a version discrimination signature using an executable file generated in a development environment, according to at least some embodiments. As shown, object file 410 corresponding to at least a portion of the source code of a long-running program LRP may comprise one or more modifiable (at run-time) sections 415, and one or more read-only sections 418 in the depicted embodiment. From within the read-only sections, a portion 419 of object code may be selected which is sufficient for uniqueness among a set of versions of interest. As mentioned earlier, in at least some embodiments, portions of code which may be designated or marked as being writable, but which nevertheless do not change at run time with respect to the on-disk representations such as the object files 410 generated at the development environment, may be selected for version discrimination. (The term "read-only" may in some cases be used as a proxy herein to indicate portions of a program that are not expected to change between the on-disk representations of the program and in-memory representations of the program.) An optimization technique that examines corresponding contents at the same offsets within different versions of an executable file 410 iteratively may be implemented in some embodiments to select portion 419, as discussed in further detail below with respect to FIG. 9. In some embodiments, an object file's read-only sections may be small enough that the entire read-only sections may be used instead of selecting a subset. In at least some implementations, a long-running program may comprise a plurality of executable files, and respective read-only subsets within more than one file may be identified as the inputs to be used in combination to generate the version discrimination signatures.

In the depicted embodiment, optimized signature generator 450 may select the subset 419 of the read-only sections, and apply one or more transformation functions 422 (e.g., selected hash functions) to generate development environment version discrimination signature 450. In addition, a discriminator descriptor 423 (which may also be referred to as a signature descriptor) may be produced, which can be provided to the entities responsible for obtaining the run-time signatures at the execution platforms in the depicted embodiment. The discriminator descriptor may indicate, for example, the particular sections of the in-memory representations (and the particular starting and ending offsets within those sections) which are to be read to generate the run-time version discrimination signatures. In at least one embodiment a discriminator descriptor may also indicate the transformation function(s) 422 to be used for generating run-time signatures.

Run-Time Version Discrimination Signatures

Figure 5:
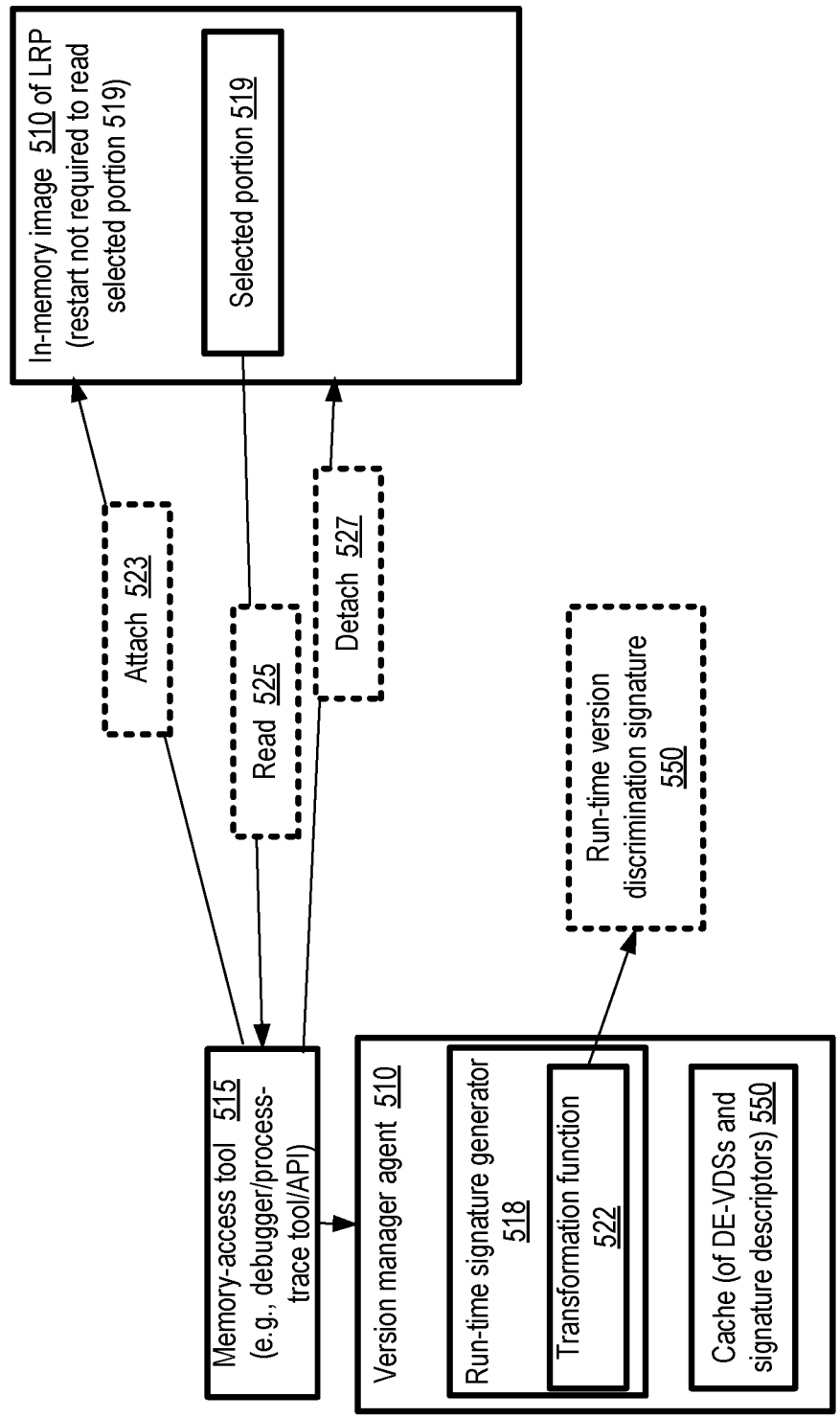
FIG. 5 provides an overview of example operations which may be performed by a version manager agent to determine the version of a running program, according to at least some embodiments.

As mentioned earlier, respective local agents installed at the execution platforms may be responsible for interacting with the in-memory representations of programs in various embodiments. FIG. 5 provides an overview of example operations which may be performed by a version manager agent to determine the version of a running program, according to at least some embodiments. As shown, a version manager agent 510 at an execution platform may utilize a memory access tool 515, such as a debugger, a process tracing tool, or an application programming interface (API) which enables the content of platform memory to be examined, to obtain the contents of the in-memory instance 510 of the program of interest, without stopping or restarting the program. Some operating systems may provide system calls which allow at least a subset of memory in use by a running program to be read, for example, and such system calls may be used by the version manager agent 510 in various embodiments. In some implementations, invoking a memory access tool 515 may slow (or temporarily pause) normal operations of the running program for a short duration, but the state information of the running program may not be overwritten or lost, and as a result the program may continue to run while the needed information is extracted from its memory image.

In the depicted embodiment, the agent 510 may use tool 515 to attach to the running instance 510, read contents at specified offsets within the memory image of the running instance, and then detach from the running instance. The particular sections which are to be read may be indicated to agent 510 in discriminator descriptors of the kind discussed earlier (which may for example include section names or identifiers and offset ranges of the bits/bytes within the sections which are to be read). The bits that are read may be supplied as input to transformation functions 518 (e.g., the same hash functions which were used to generate the development environment signatures) by the run-time signature generator 518. In some cases the discriminator descriptors provided to the agent 510 may specify the transformation functions as well. Output from the transformation functions may constitute the run-time version discrimination signature 550, which may be compared with development environment version discrimination signatures to identify the version of running instance 157 in the depicted embodiment.

Of course, a given execution platform may have several different long-running programs executing concurrently, for each of which numerous versions and corresponding DE-VDSs may exist. In some embodiments, the DE-VDSs and associated discriminator/signature descriptors may be transmitted to the agent 510 (e.g., from the version manager or some other administrative component of the system) and stored in a cache 550. In at least one embodiment, in which for example dynamic updates to the running instances of the long-running programs may be applied as and when needed, R-VDSs generated from the running instances may also be stored or cached at least temporarily, e.g., to provide evidence of the sequence in which dynamic updates were applied.

Example Executable File Contents

Figure 6:
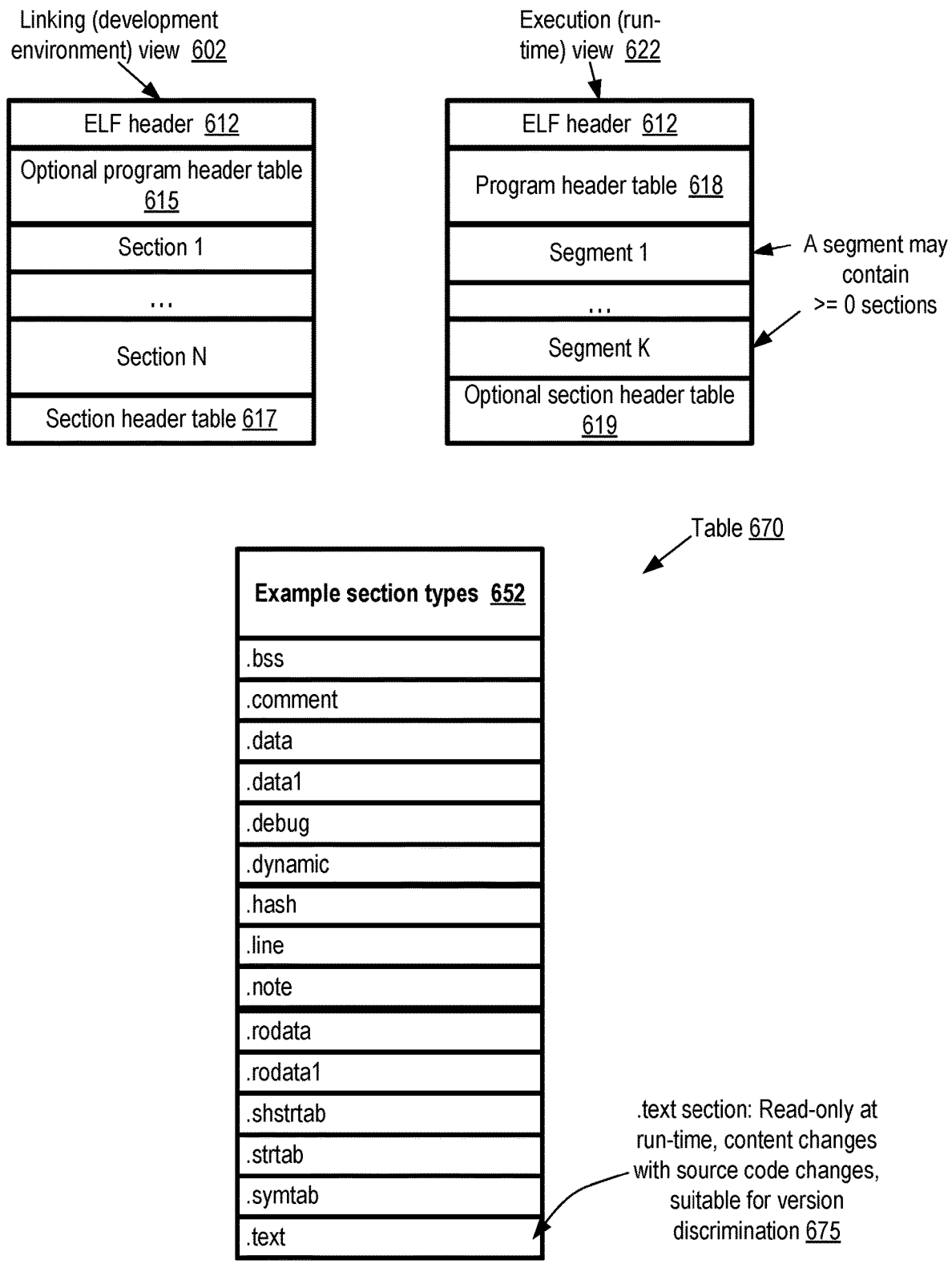
FIG. 6 illustrates example sections of an object file format which may be used for generating version discrimination signatures from software builds and memory images, according to at least some embodiments.

FIG. 6 illustrates example sections of an object file format which may be used for generating version discrimination signatures from software builds and memory images, according to at least some embodiments. Although ELF (executable and linkable format), which may be employed in some Unix-based computing environments at which x86 (or x86-compatible) hardware is utilized, is presented as an example format for FIG. 6, the techniques for signature generation and comparison that are discussed herein may be applied regardless of the specific file format chosen in various embodiments. For example, similar algorithms for generating development environment signatures using selected subsets of object files, computing corresponding run-time signatures and comparing the run-time signatures with the development environment signatures to determine versions of running programs may be used in computing environments where the file format used is COFF (Common Object File Format), extended COFF (XCOFF or ECOFF), Mach object file format (MACH-O), PE (portable extensible), or any other format.

Generally speaking, several types of object files may be generated and used in various computing environments, such as executable files, relocatable files and shared object files. An executable file may comprise a program suitable for execution. A relocatable file may comprise code and data suitable for linking with other object files to create an executable file or a shared object file. A shared object file may comprise code and data suitable for linking in two contexts. First, a link editor may process it with other relocatable and shared object files to create another object file. Second, a dynamic linker may combine it with an executable file and other shared objects to create a process image.

Two views of an object file which employs ELF (specifically, Version 1.2 of ELF released by the Tools Interface Standards committee) are shown in FIG. 6: the linking or development environment view 602, and the execution or run-time view 622. In each view, the file comprises an ELF header 612, which resides at the start of the file and provides a roadmap of the remaining contents of the file. A program header table (615 or 618), if present, may contain information on how the system is to create a process image. Files used to build a process image (execute a program) may require a program header table; relocatable files may not need a program header table. A section header table (e.g., 617 or 619) may contain information describing the file's sections (e.g., sections 1 through N in FIG. 6). Every section may have a corresponding entry in the section header table; each entry gives information such as the section name, the section size, and so on. Files used during linking may require a section header table; other object files may or may not have one. A given segment (such as any of segments 1 through K) may comprise one or more sections. In various embodiments, when generating a development environment version discrimination signature, view 602 may be used to identify the portions of the file which are to be used for the signatures; when generating the run-time signatures, view 622 may be used. For example, respective header tables included in the file may be used to identify the specific offset ranges of the file which are to be used for the discriminator or signature.

Various sections for different types of program and control information are defined in the ELF specification. Examples of several sections which may be present in ELF files are shown in table 670. Among the different sections in a given file corresponding to a long-running program, sections which have the following characteristics may be preferred for signature generation in some embodiments: the sections should not be modifiable at run time, the sections should be loaded into memory at the execution platforms, and the sections should not remain invariant across all versions of the program. Among the sections shown in FIG. 6, the .text section, which contains executable instructions, may be used most often for signatures in at least some embodiments, although one or more of the other sections may also or instead be used in some embodiments. As discussed below in further detail, only a subset of a section, which is found to be sufficient for distinguishing among the versions of interest based on an iterative analysis, may be used to generate signatures in at least some embodiments; that is, the entire section may not be used.

A brief explanation of the different kinds of sections shown in table 670 is provided here. A .bss section may be used for un-initialized data, typically zeroed at the time of program startup. A .comment section may be used (as implied by the name) for comments. The .data and .data1 sections may be used for initialized data that forms part of the memory image. A .debug section may comprise information used for symbolic debugging. Dynamic linking information may be stored in the .dynamic section. A symbol hash table may be stored in the .hash section. A line section may contain source code line number information, correlating the source code with executable code, which may be useful for debugging. Special information that may be used to check compatibility, conformance or the like may be stored in a .note section. The .rodata and .rodata1 sections may contain read-only data that is included within the in-memory process image. The .shstrtab section may contain section names. The .strtab section includes strings such as names corresponding to symbol table entries. The .symtab section includes a symbol table. The .text section, as mentioned above, includes the executable instructions of the program. Other section types may be included within an object file in various embodiments, while some of the section types shown in table 670 may not be used in at least some embodiments. In various embodiments, regardless of the particular file format(s) being used, a read-only part of an object file corresponding to the program for which version identification is to be accomplished may be identified, and some subset or all of the read-only part may be used to distinguish between the versions of interest. As mentioned above, in at least one embodiment, a portion of an object file which is not designated as read-only may be used, as long as it is not modified at run-time.

Signatures with and without Defective Code

In at least some embodiments, the signature-based scheme for version determination of a running program may be implemented at least in part to help identify the execution platforms at which a defect-containing version of the program may be running. However, in at least some cases, the portions of the code which are used for uniquely identifying the versions may not necessarily include the defect-causing code itself.

Figure 7:
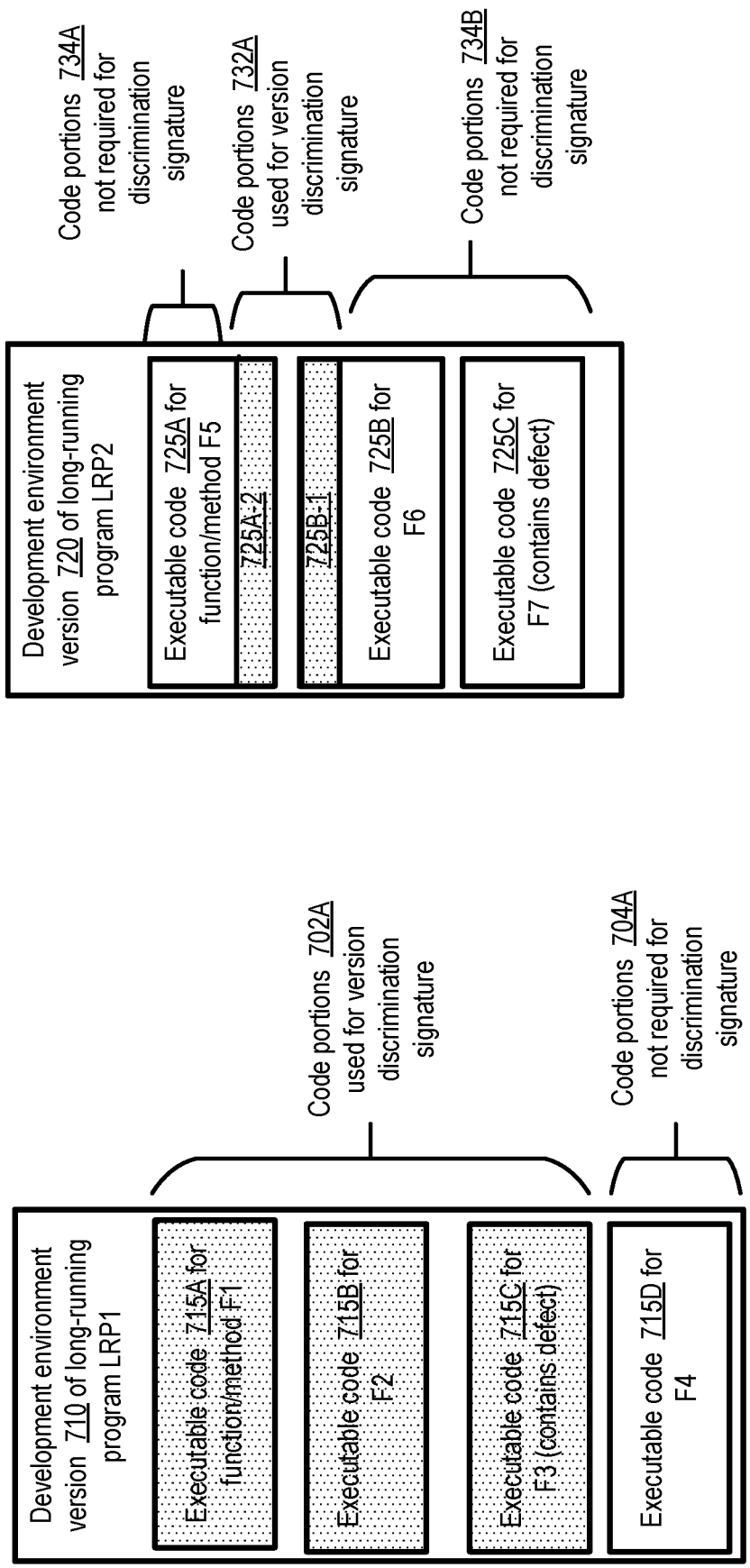
FIG. 7 illustrates alternative scenarios with respect to whether the code corresponding to a given defect is used for version discrimination, according to at least some embodiments.

FIG. 7 illustrates alternative scenarios with respect to whether the code corresponding to a given defect is used for version discrimination, according to at least some embodiments. As shown, a development environment version 710 of a long-running program LRP1 may comprise sections of code 715A-715D respectively corresponding to functions/methods F1, F2, F3 and F4 in the depicted embodiment. In the example shown, a defect may have been identified in the function F3. The sections that are selected for generating the version discrimination signature may include 715A, 715B and 715C in the depicted example, as indicated by label 702A, while section 715D may not be required for the signature, as indicated by label 702B. Because of the inclusion of section 715C, the defective code (corresponding to function F3) may contribute to the version discrimination signature. Note that the analysis which led to the selection of sections 715A-715C for the signature may not have taken the location of the defect into account—instead, the analysis may simply have been targeted towards a subset of executable code which guarantees uniqueness among the different versions of LRP1.

In the case of development environment version 720 of a different long running program LRP2, code sections 725A-725C correspond to three functions or methods F5, F6 and F7 respectively. The code selection algorithm used for signature input identification has selected a subset of section 725A and a subset of section 725B for the signature, as indicated by label 732A. Section 725C, which actually includes the defective code, is not used for the signature; neither are subsets of sections 725A and 725B, as indicated by labels 734A and 734B.

Dynamically-Linked Libraries

Figure 8:
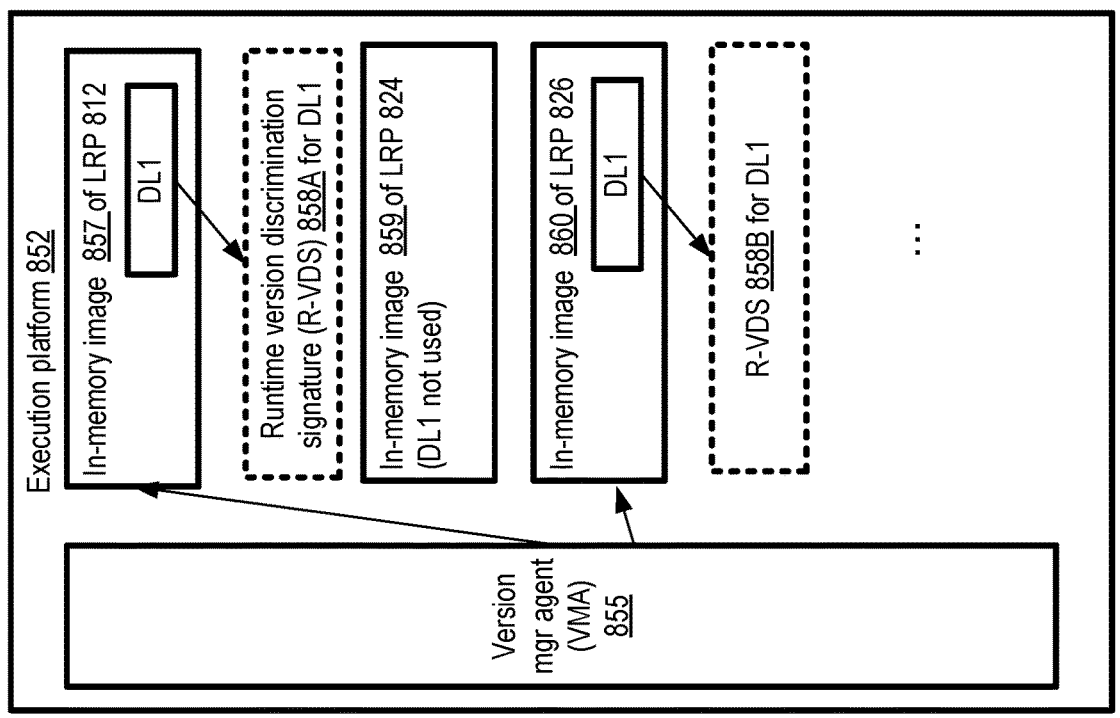
FIG. 8 illustrates an example scenario in which the versions of a dynamically linked library which are being used by various long-running programs may be determined, according to at least some embodiments.
Figure 8:
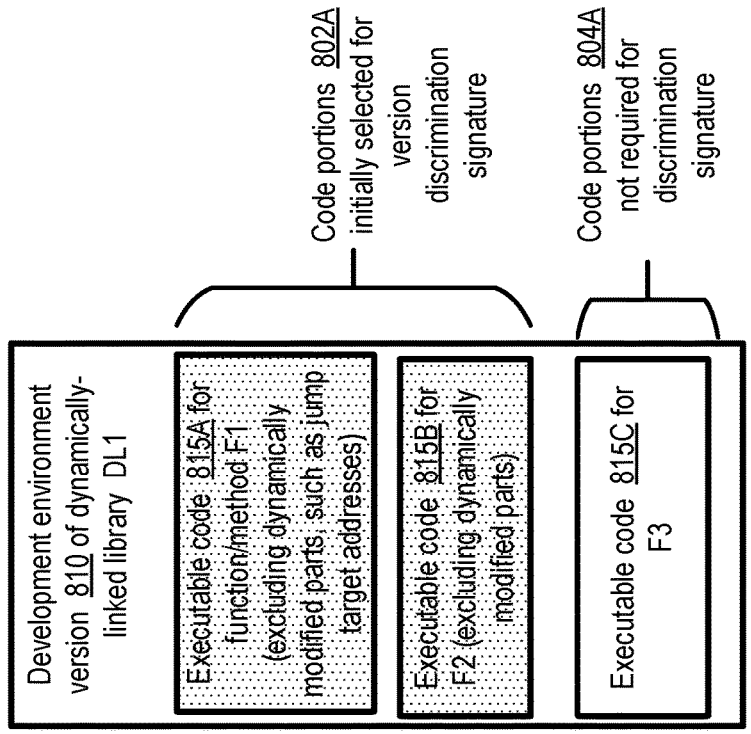

In some embodiments, a similar signature-based approach may be taken with respect to identifying the versions of dynamically linked libraries which may be in use in a computing environment. FIG. 8 illustrates an example scenario in which the versions of a dynamically linked library which are being used by various long-running programs may be determined, according to at least some embodiments. As in the case of non-library programs discussed above, sections 802A of the compiled development environment version 810 of a dynamically-linked library DL1 may be identified which can be used to generate the development environment version discrimination signatures for DL1. The portions of DL1 selected may be expected to remain unmodified between on-disk representations of the libraries (generated at a development environment) and in-memory representations of the libraries. Dynamically modifiable parts of the executable code 815A and 815B for F1 and F2 respectively (e.g., code associated with the equivalents of JMP or CALL instructions, whose target addresses may be modified dynamically at load time) may be excluded from the portions used for the signature in the depicted embodiment. In some embodiments, dynamically modifiable portions of the library code (such as JMP target addresses) may be restricted to specific sections of the object files, and such sections may be excluded from the portions used for the signatures.

At the execution platform 852, the version manager agent 855 may determine (e.g., using process trace tools, debugger tools or other similar tools) whether any of a set of long-running programs such as LRPs 812, 824 and 826 use the dynamically linked library DL1. From the memory images 857 and 860 of those long-running programs such as 812 and 826 which use DL1, a respective DL1 run-time version discrimination signature (e.g., R-VDS 858A or 858B) may be obtained. The R-VDSs may be compared to the DE-VDSs generated from the development environment versions of DL1 to uniquely identify the version of the library being used. Defect remediation actions may be initiated if needed (e.g., if the version of DL1 in use has a defect, a hot-patch may be applied). The long-running programs such as LRP 824 which do not utilize Dl1 may continue to run unaffected by the DL1 version determination actions of VMA 855. As in the case of programs other than dynamically-linked libraries, version identification based on examining object code portions of the dynamically-linked libraries may also be used for purposes other than defect fixing in some embodiments. For example, records of the particular versions of various libraries are in use at different execution platforms may be maintained for fleet health management purposes in one embodiment.

Methods for Identifying Versions of Running Programs

Figure 9:
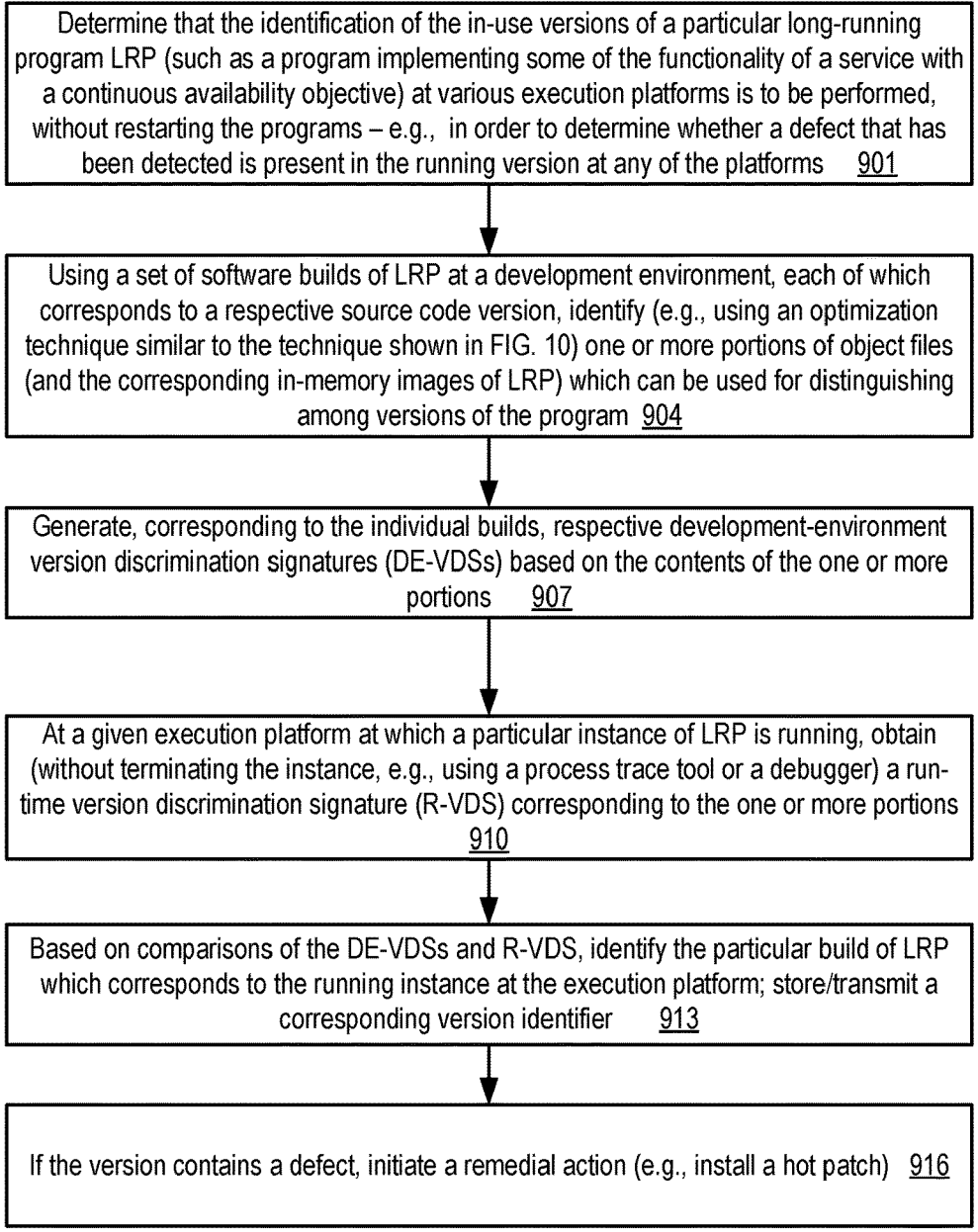
FIG. 9 is a flow diagram illustrating aspects of operations that may be performed to identify versions of running programs using signatures derived from executable files, according to at least some embodiments.

FIG. 9 is a flow diagram illustrating aspects of operations that may be performed to identify versions of running programs using signatures derived from executable or object files, according to at least some embodiments. As shown in element 901, a determination may be made that the in-use versions of a long-running program LRP at various execution platforms are to be identified, without restarting the programs. The long-running program may, for example, ideally be kept running at a given execution platform over a long time span during which several new versions of the program may have been generated at a development environment (and potentially deployed at other execution platforms). In some cases, the program may implement some of the functionality of a network-accessible service with a very high availability requirement, such that restarts of the program may potentially impact the ability of the service to meet its service level agreement regarding uptime or availability. In some cases, the decision to identify the versions may be triggered by the detection of a defect which may be present in some versions of the program—that is, one of the reasons why the versions may need to be identified may include the need to remedy a defect.

As shown in element 904, using a set of software builds of LRP generated at a development environment, a portion of one or more object files corresponding to the program may be identified, which can be used to distinguish among versions of the program. Each build may correspond to a different source code version in the depicted embodiment. The builds used for identifying the portions of object code may be referred to as "authorized" or "official" builds, in that the operator of the computing environment may have designated these builds as being suitable for deployment. (In contrast to authorized builds, a given developer may, for example, generate a private build in some development environments, which may include untested code or unapproved code and hence may be considered unauthorized or unofficial). The portion of the object files may be selected based on a variety of criteria, including for example a requirement that the portion be present in the memory images of running instances of the program, and a requirement that the portion is not modified at run-time. Note that some sections of executable files may not be loaded into memory at run time, and may therefore be inappropriate for version identification relying on memory images; others may be modified at run-time, and may be inappropriate for that reason. An iterative optimization algorithm (described in greater detail with respect to FIG. 10) may be used to select parts of the object file(s) that (a) allow each version of the set of versions of interest to be uniquely identified and (b) are small enough in their cumulative size that the resources and time required to extract them and perform the necessary computations on them at run time is kept within reasonable limits.

In the depicted embodiment, respective development-environment version discrimination signatures (DE-VDS) may be generated from the selected portions of the object files for each build or version of interest (element 907). For example, in some embodiments, the bit-sequence or byte-sequence making up the selected portions may be provided as input to a selected hash function or some other kind of transformation function, and the output of the hash function or transformation function may be used as the DE-VDSs for each of the builds. The version discrimination signatures may comprise a relatively small number of bits in at least some embodiment—e.g., a hash function whose output consists of 256 bits may be used. As a result, even if hundreds of builds may be in use concurrently in the computing environment, and all the DE-VDSs are transmitted to each of the execution platforms, the total amount of network traffic generated for version identification of a given program may be quite low. In some embodiments, the same portions of an object file which were used for version discrimination with respect to K different builds may be sufficient to distinguish the $(K+1)^{th}$ build from the earlier K builds—that is, some DE-VDSs may be reusable in such embodiments. In other embodiments, at least in some cases DE-VDSs may have to be re-generated when a new build is created—e.g., because it may not be possible to use the same portions to uniquely differentiate a new build from at least one previously-created build.

At a given execution platform at which an instance of the long running program LRP is running, a run-time version discrimination signature (R-VDS) may be obtained from the running instance (element 910), e.g., by attaching a debugger or process tracing tool to the program, reading the selected portions of code from the memory image of the program, and applying the transformation functions that were used to generate the DE-VDSs.

Based on comparisons of the DE-VDSs and the R-VDS, the particular version of the program which is running at the execution platform may be determined (element 913). A record of the version (e.g., an identifier of the corresponding build whose DE-VDS matches the R-VDS) may be stored locally and/or transmitted to a version management database in some embodiments. Although very unlikely, it may at least in principle be possible that the R-VDS does not match any of the DE-VDSs with which it is compared. This may occur, for example, if a DE-VDS was not generated at the development environment for the version which is running at the execution platform, if the DE-VDS (or R-VDS) was somehow corrupted, or (in extremely rare cases) if unauthorized changes were made to LRP at the execution platform. In some embodiments, if no match is found between the any DE-VDS of the expected list of DE-VDSs and the R-VDS, an alert may be raised, indicating that evidence of an unauthorized build or a security breach has been detected.

It is noted that the use of signatures based on transformations to the bits/bytes selected for distinguishing versions may be considered a performance optimization, and signatures may not be used in at least one embodiment. In such an embodiment, the raw (untransformed) bits constituting the selected portions of the object files and the memory images may be compared to identify the versions of the running program instances. For example, a set of bytes that represent contents of one or more data structures of the program may be sufficient to distinguish among different versions of the program, and such a set of bytes may be used as a version discriminator without applying transformation functions in one embodiment. Of course, depending on the size of the code portions used, the comparisons may take longer than if relatively short signatures were used to represent the code portions. However, note that the use of transformation functions for signatures may introduce a (low) possibility of error, e.g., due to hash collisions. In one embodiment, therefore, if a given DE-VDS matches an R-VDS, a second level of matching may be performed using the raw or untransformed bits of the object code instead of the signatures, and the signature-based version identification may be confirmed if the untransformed bits match.

Figure 10:
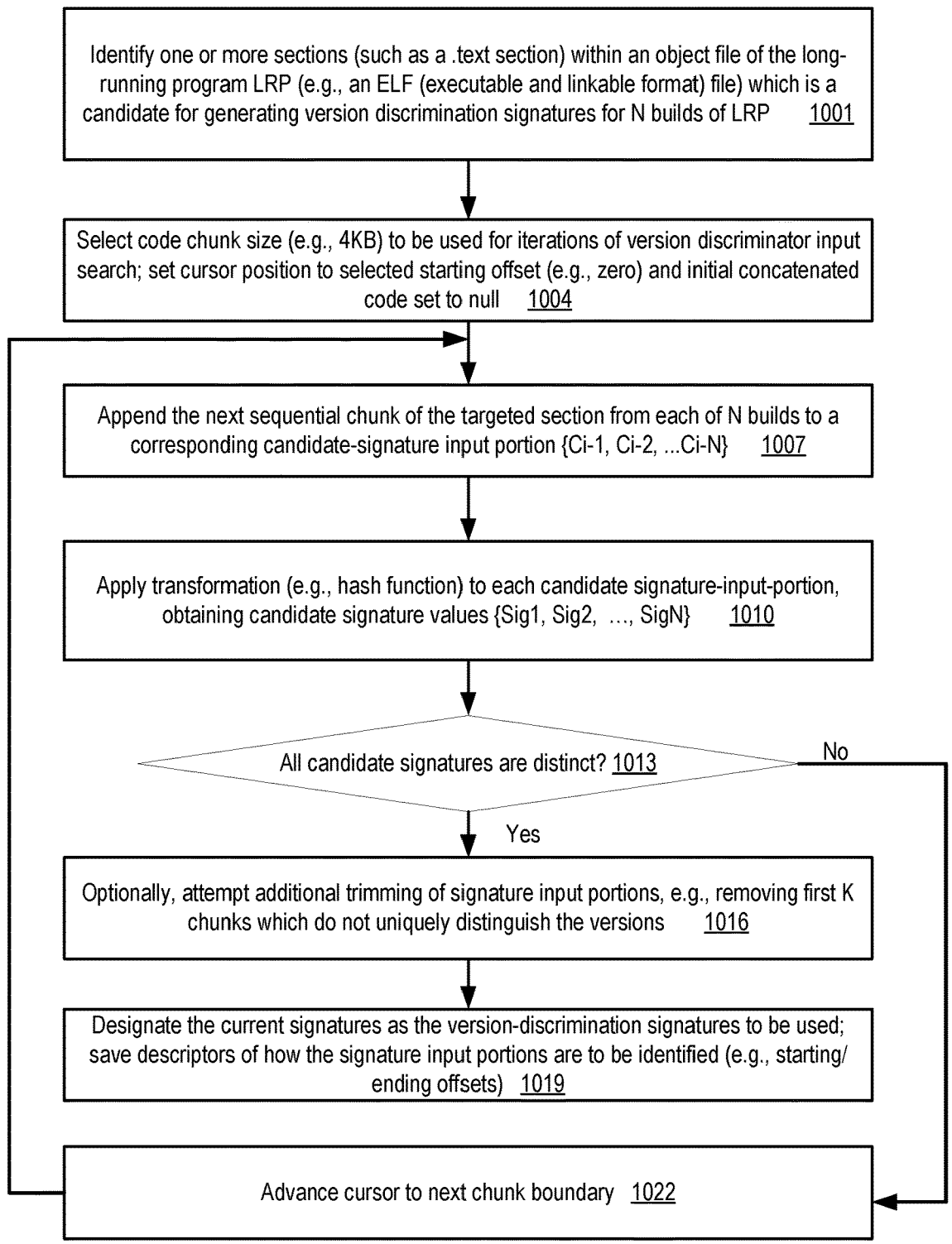
FIG. 10 is a flow diagram illustrating aspects of operations that may be performed to select specific portions of files to be used as input for version discrimination signatures, according to at least some embodiments.

FIG. 10 is a flow diagram illustrating aspects of operations that may be performed to select specific portions of files to be used as input for version discrimination signatures, according to at least some embodiments. As shown in element 1001, one or more sections (e.g., similar to a .text section of the kind discussed in the context of FIG. 6) of an object file corresponding to a particular long-running program LRP may be identified as a candidate section from which a version discrimination signature is to be derived. The names of the candidate section(s) may differ based on the file format standard (e.g., ELF, COFF, PE, etc.) being used for the program. In at least some embodiments, sections which are (a) stored in the object files created in the development environment, and (b) loaded into memory at the execution environment (and not expected to be changed while in memory), may be selected as candidates. The objective of the algorithm whose operations are indicated in FIG. 10 may be summarized as follows: for a given set of N builds of LRP, identify, by progressively examining larger and larger portions of the object code, a small (though not necessarily minimized) set of object code of LRP which can be used to uniquely distinguish among the N builds.

A chunk size (e.g., four kilobytes) to be used for accumulating the portions of the object code for successive iterations of the algorithm may be selected (element 1004). A respective cursor into the candidate object file section for each of the N builds may be initialized to an offset of zero in the depicted embodiment, and a concatenated code set to be used as input for the signatures may be set to null for each of the N builds.

The next iteration of the algorithm may be begin, by appending the next sequential chunk of each of the object file sections to the corresponding concatenated code sets for the N builds, and moving the cursor ahead by the chunk size. The concatenated code for the $i^{th}$ build may be referred to as candidate-signature input portion Ci-i (element 1007). Thus, for example, if there are 10 builds, the chunk size is four kilobytes, the .text section of the file is selected as the candidate section, and the initial cursor position is at offset 0 within the .text sections, ten four-kilobyte portions Ci-1, Ci-2, Ci-3, . . . , Ci-10 would be identified in the first iteration, each comprising the first four kilobytes of the object file in a respective build.

From the candidate-signature input portions, a respective signature (Sig-i, where "i" is the index of the build) may be computed for each of the N builds by applying a selected transformation function (element 1010) such as a hash function. The signatures may be compared to one another to determine whether there are any duplicates in the depicted embodiment.

If all the signatures are unique relative to one another (as detected in operations corresponding to element 1013), this means that the concatenated chunks examined thus far are sufficient to distinguish among the builds. In some embodiments, an additional optimization step may optionally be conducted at this stage, as indicated in element 1016, in which some of the chunks concatenated earlier in the process may be removed while still ensuring uniqueness. If any chunks are pruned, new signatures may be generated after pruning and their mutual uniqueness may be verified.

The unique signatures (obtained either with or without pruning the candidate signature input portions) may be designated as the version discrimination signatures to be used, and descriptors of how the signature input portions are to be identified at run-time (e.g., the starting and ending offsets in the selected object code sections) may be saved for use at the execution platforms (element 1019).

If the signatures computed in the current iteration are not unique (i.e., if at least one of the signatures matches one of the other signatures), as also detected in operations corresponding to element 1013, the cursor may be advanced by the chunk size. The next iteration may be begun, in which operations corresponding to elements 1007 onwards may be repeated, until eventually a unique set of version discrimination signatures is obtained. In some embodiments, the signatures may be identical to the contents of the candidate signature input portions—that is, instead of producing a reduced-size signature using a hash function or the like, no transformation function may be applied. In various embodiments, a database indicating the specific portions of a program that can be used to uniquely distinguish the currently usable program versions from one another may be modified over time. Assume, for example, that the set of bytes within offset range O1-O2 of a particular section S1 of an object file corresponding to a program LRP1 is sufficient to distinguish among the first N versions of LRP1. An indication of this offset range may be stored in a version management database and used as needed for version discrimination using the techniques described above. When version (N+1) of LRP1 is produced, the set of bytes that were previously being used for version discrimination may no longer be usable—e.g., because the set of bytes in range O1-O2 of S1 is identical in some version K (where K<=N) and new version (N+1). As such, a new portion of object code may have to be identified which can be used to distinguish among all (N+1) versions, and the database may be updated accordingly.

A number of variants of the scheme illustrated in FIG. 10 may be used in different embodiments. For example, in one embodiment, instead of iteratively appending chunks to the candidate signature input portion, a window-based approach may be used. A tentative object code window size of, say, 64 kilobytes may be chosen, and in the first iteration, the first 64 kilobytes (starting at offset 0 within, for example, a .text section) of each build's object file may be examined to determine whether all the builds can be distinguished from one another using the first 64 kilobytes. If the builds cannot be uniquely identified using the first window position, the window may be advanced by a particular step size (e.g., 4 kilobytes), with the contents between offsets 4-kilobyte and 68-kilobyte being examined to verify uniqueness among the builds in the second iteration, and so on. If it turns out that a 64-kilobyte window was insufficient, a 128-kilobyte window may be used, with the window size gradually being increased.

It is noted that in various embodiments, at least some operations other than those illustrated in the flow diagrams of FIG. 9 and FIG. 10 may be used to implement the version identification techniques described above. Some of the operations shown may not be implemented in some embodiments or may be implemented in a different order, or in parallel rather than sequentially.

Use Cases

The techniques described above, of utilizing selected portions of object code which are present both in development environment artifacts and in the memory images of running programs for version identification, may be extremely useful in a number of scenarios. Many programs which support high-availability services (including for example, virtualized computing services at provider networks) may be expected to run for long time periods such as months or years without being restarted. The fleets at which such long-running programs are deployed may contain thousands of hosts. Especially in environments in which the programs can be updated dynamically without restarting, and thus mismatches may exist between the on-disk versions of programs and the running versions, it may be a challenge to determine exactly which version of a program is being run at a given platform. By identifying small sets of object code which can be used to distinguish among the builds of the long-running program, and extracting corresponding code from memory images of the programs for comparison, it may become possible to unambiguously identify the versions of the running programs. This may in turn lead to simplification of defect remediation procedures (e.g., for security-related defects which may require urgent fixes), since hot patches may only need to be applied to programs which have been clearly identified as requiring the patches.

Illustrative Computer System

Figure 11:
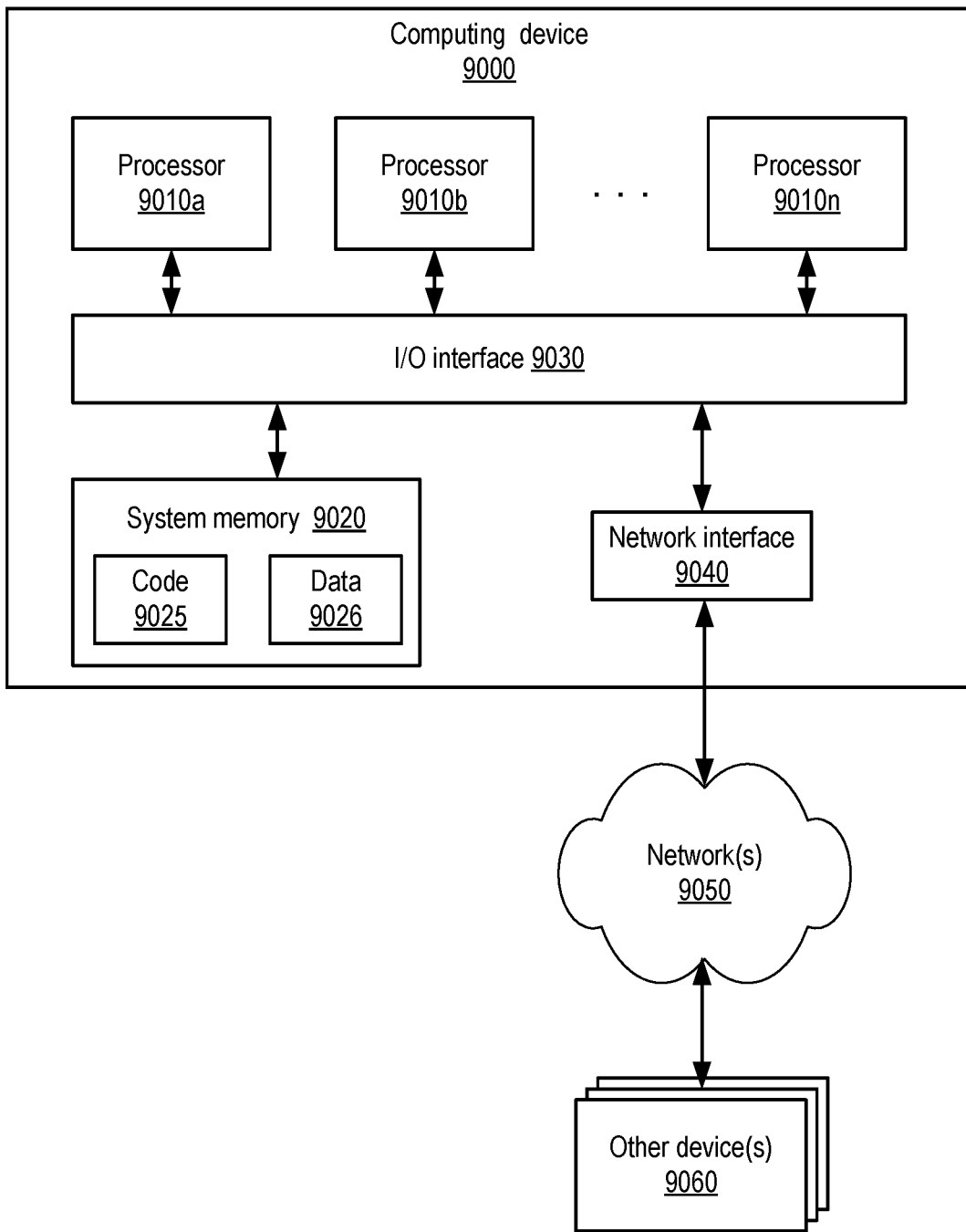
FIG. 11 is a block diagram illustrating an example computing device that may be used in at least some embodiments.

In at least some embodiments, a server that implements a portion or all of one or more of the technologies described herein, including the version managers, version manager agents, development environment components, and execution platforms, may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to:
   determine that a defect associated with running instances of a program has been detected;
   identify one or more portions of object code of the program which are to be used as version discriminators, based on progressively examining larger portions of the object code for a set of software builds of the program, wherein individual ones of the software builds correspond to respective source code versions of the program, wherein the one or more portions are present in (a) the software builds and (b) memory images of the running instances of the program;
   generate, with respect to the individual ones of the software builds, respective development-environment version discrimination signatures, wherein a particular development-environment version discrimination signature represents the one or more portions of object code of a corresponding software build;
   obtain, without terminating an execution of a first running instance of the program at a particular execution platform, a run-time signature corresponding to the one or more portions of object code in a memory image of a first running instance of the program;
   determine, based at least in part on a comparison of the run-time signature with one or more of the development-environment version discrimination signatures, that the first running instance is one of the versions that correspond to the defect; and
   cause a remediation operation to be performed to the first running instance to remediate the defect.

2. The system as recited in claim 1, wherein the remediation operation comprises a dynamic in-memory modification of at least some executable code of the first running instance, without restarting the first running instance.

3. The system as recited in claim 1, wherein to obtain the run-time signature, the one or more computing devices are configured to:
   cause a process tracing tool to be attached to the first running instance.

4. The system as recited in claim 1, wherein to identify the one or more portions, the one or more computing devices are configured to:
   identify, using one or more executable file header entries, a read-only section of an object file; and
   include at least a subset of the read-only section in the one or more portions to be used as version discriminators.

5. The system as recited in claim 1, wherein to identify the one or more portions, the one or more computing devices are configured to:
   identify a common portion of object code, wherein the common portion is included within (a) a first compiled version of the program, wherein the defect is not present in the first compiled version and (b) a second compiled version of the program, wherein the defect is present in the second compiled version; and
   exclude the common portion from the one or more portions to be used as version discriminators.

6. A method, comprising:
performing, at one or more computing devices:
   determining that a defect has been identified with respect a program;
   identifying one or more portions of object code of the program which are to be used as version discriminators, based on progressively examining larger portions of the object code for a set of software builds of the program;
   generating, with respect to the individual ones of one or more compiled versions of the program, respective development-environment signatures, wherein a particular development-environment signature corresponds to the one or more portions;
   obtaining, with respect to a first running instance of the running instances of the program, a run-time signature corresponding to the one or more portions;
   determining, based at least in part on a comparison of the run-time signature with one or more development-environment signatures, that the first running instance is one of the versions that correspond to the defect; and causing a remediation operation to be performed to the first running instance to remediate the defect.

7. The method as recited in claim 6, wherein the remediation operation comprises a dynamic in-memory modification of executable code of the first running instance, without restarting the first running instance.

8. The method as recited in claim 6, further comprising:
transmitting, prior to determining that the remediation operation is to be initiated, at least one development-environment signature to an execution platform used for the first running instance.

9. The method as recited in claim 6, wherein said obtaining the run-time signature comprises:
invoking an application programming interface enabling memory contents to be read at an execution platform used for the first running instance.

10. The method as recited in claim 6, wherein said identifying the one or more portions of object code comprises:
identifying a read-only part of an executable file; and
including at least a subset of the read-only part in the one or more portions to be used as version discriminators.

11. The method as recited in claim 6, wherein said identifying the one or more portions of object code of the program comprises:
identifying a common portion of object code, wherein the common portion is included within (a) a first compiled version of the program and (b) a second compiled version of the program; and
excluding the common portion from the one or more portions to be used as version discriminators.

12. The method as recited in claim 6, further comprising performing, by the one or more computing devices:
determining that a particular dynamically-linked library is being used by (a) a first program at an execution platform and (b) a second program at the execution platform;
identifying, based at least in part on an examination of a respective portion of the dynamically linked library corresponding to the first program and the second program, respective versions of the dynamically-linked library being used by the first program and the second program, wherein the portion of the dynamically-linked library corresponding to the first program is unmodified with respect to an on-disk version of the dynamically linked library being used by the first program, and wherein the portion of the dynamically-linked library corresponding to the second program is unmodified with respect to an on-disk version of the dynamically linked library being used by the second program; and
storing an indication of the respective versions of the dynamically-linked library.

13. The method as recited in claim 6, wherein the defect corresponds to a particular section of source code which is compiled into a particular set of executable code, and wherein the one or more portions do not include at least some executable code of the particular set.

14. The method as recited in claim 6, wherein the one or more compiled versions of the program correspond to respective authorized builds of the program, further comprising performing, by the one or more computing devices:

determining that a second run-time signature corresponding to the one or more portions, obtained from a second running instance of the program, does not match a development-environment signature corresponding to an authorized build; and
causing an alert to be generated with respect to the second running instance.

15. The method as recited in claim 6, wherein the program comprises one or more of: (a) a subcomponent of a virtualization manager, (b) an operating system daemon, (c) a system management program, (d) a program implementing operations associated with a domain name service, or (e) a program implementing operations associated with DHCP (Dynamic Host Configuration Protocol).

16. A non-transitory computer-accessible storage medium storing program instructions that when executed on one or more processors:
determine that a defect has been identified with respect to running instances of a program;
identify a particular portion of the program to be used as a version discriminator, based on progressive examination of larger portions of object code for a set of software builds of the program, wherein the particular portion is readable from (a) one or more on-disk representations of the program and (b) one or more memory images of the running instances of the program;
obtain, while a first running instance of the running instances of the program is running, a first representation of the particular portion from a first memory image of the first running instance of the program, wherein the first memory image corresponds to a first running instance of the program;
determine, based at least in part on a comparison of the first representation of the particular portion with one or more representations of the particular portion, that the first running instance corresponds to the one or more versions of the program associated with a defect; and
cause a remediation operation to be performed to the first running instance to remediate the defect.

17. The non-transitory computer-accessible storage medium as recited in claim 16, wherein to obtain the first representation, the instructions when executed on one or more processors:
apply a transformation function to the particular portion.

18. The non-transitory computer-accessible storage medium as recited in claim 16, wherein to obtain the first representation, the instructions when executed on the one or more processors: cause a debugger to be instantiated at an execution platform used for the first running instance.

19. The non-transitory computer-accessible storage medium as recited in claim 16, wherein the particular portion of the program is designated as writable.

20. The non-transitory computer-accessible storage medium as recited in claim 16, wherein the particular version comprises code corresponding to a defect, and wherein the instructions when executed on one or more processors: cause a defect remediation action to be initiated with respect to the first running instance.

* * * * *